Nov. 4, 1969     H. D. SULLIVAN     3,475,883

ROTARY SCREEN SEAL

Filed June 21, 1967

INVENTOR
HERBERT D. SULLIVAN
BY
ATT'Y.

United States Patent Office 3,475,883
Patented Nov. 4, 1969

3,475,883
ROTARY SCREEN SEAL
Herbert D. Sullivan, Hinsdale, Ill., assignor to International Harvester Company, Chicago, Ill., a corporation of Delaware
Filed June 21, 1967, Ser. No. 650,566
Int. Cl. B01d 46/26
U.S. Cl. 55—290                                   6 Claims

ABSTRACT OF THE DISCLOSURE

A seal for preventing the passage of dust between the peripheral edge of a rotary air filter and a stationary housing. The seal is formed of a continuous brush fixed on either the stationary housing or on the rotatable filter and is adapted to frictionally engage an annular surface of the other during rotation.

BACKGROUND OF THE INVENTION

The present invention relates generally to improvements in a system of gas separation to remove dust and other foreign matters from the ambient atmosphere of a vehicle.

In harvesting grains with a combine, a cloud of dust is created so that it envelopes the combine. It is thus necessary to cleanse the air used to cool the engine powering the combine. Also air surrounding the combine is used in the combine cleaning system and it is desirable to have this air as clean as possible. Rotary air screens have been developed and used to cleanse the air before it enters the combine. The patents to Traviss, No. 1,860,697, and Pasturczak, No. 3,002,585, disclose rotary screens of the type that have been developed for this purpose. Rotary screens of the type shown in these patents, however, permit some dust to get past the screen causing problems such as overheating. Much of the offending dust does not actually pass through the screen but rather finds its way through the seal between the edge of the screen and the stationary housing. Applicant's invention relates to improvement in this seal means.

SUMMARY

The general purpose of this invention is to provide a seal between the peripheral edge of a rotary screen and its stationary housing. The seal is in the form of a continuous ribbon of brush carried by one member with the free ends of the brush in frictional engagement with the other member to permit relative rotary movement between the members. The friction between the free ends of the brush and the other member is quite small and does not adversely affect rotation of the screen. The brush can be of a density that will completely block the passage of air therethrough or it can be made less dense such that it will permit air to pass but filter out any dust or foreign matter. In one embodiment of the invention, the brush is formed from short and long bristles forming a dense base that will completely block the passage of air and a sparse edge resulting in lower frictional losses than if all the bristles were of the long length.

DESCRIPTION OF THE PREFERRED EMBODIMENTS

Figure 4:
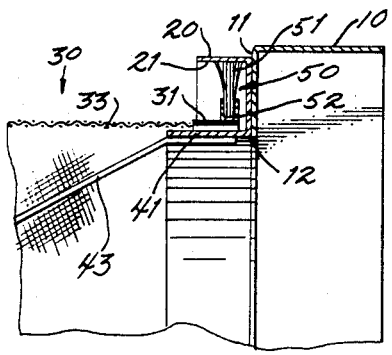
FIGURE 4 is an enlarged cross-sectional view taken along lines 4—4 of FIGURE 2.
Figure 1:
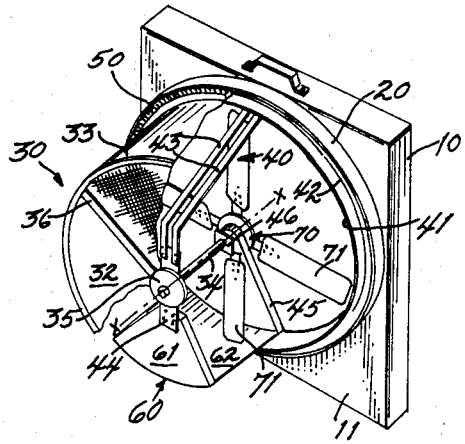
FIGURE 1 is a pictorial view of the air-cleaning device having a portion of the rotary screen broken away.
Figure 2:
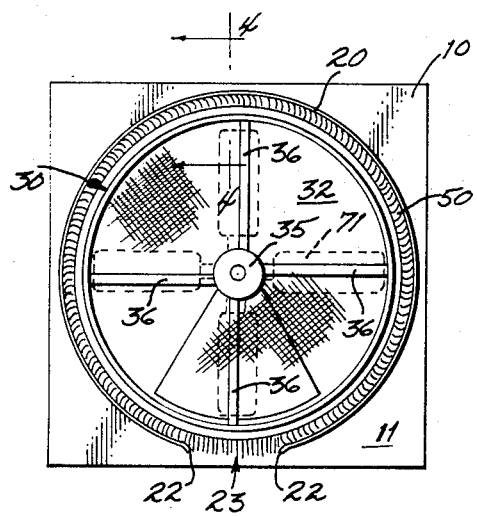
FIGURE 2 is a front view of one embodiment of the air-cleaning device.

Referring now to the drawings wherein like reference characters designate like or corresponding parts throughout the several views, there is shown in FIGURES 1, 2 and 4, one embodiment of the invention. The housing 10 is shown as a square panel having a vertical wall 11 in which is formed the air intake opening 12. It should be understood that the housing 10 is mounted on the machine such as a combine such that it fills the aperture through which it is desired to have an inflow of clean air. A first annular rim 20 is secured to the vertical wall 11 of housing 10. The rim 20 is circular in shape and has an inner generally cylindrical peripheral surface 21. As can be seen in FIGURE 2, the rim 20 is not continuous and has a pair of ends 22 forming a break 23 in the rim 20.

The housing 10 carries support means generally designated 40 for rotatably supporting a screen member 30. The support means 40 includes a second annular rim 41 that is smaller in diameter than the first annular rim 20 and located concentric thereof. As shown in FIGURE 4, the first and second annular rims 20 and 41 respectively can be formed from a single U-shaped piece of material, however, this is not necessary. The second annular rim 41 is continuous and has an outer generally cylindrical peripheral surface 42. Braces 43 are connected to the internal surface of rim 41 and extend downwardly and away from the housing 10. A bearing support plate 44 is secured to the free end of braces 43. The bearing support plate 44 carries a bearing (not shown) for the shaft 34. Rear braces 45 extend radially of the air intake opening 12 meeting at its center at which point it supports a bearing support plate 46. The bearing support plate 46 carries a bearing (not shown) in which shaft 34 is rotatably carried. The support means 40 thus provides a rotary support for the shaft 34 of the screen member 30 and provides additional support through the outer generally cylindrical surface 42 of the rim 41.

The screen member 30, as shown in the drawings, is in the form of a drum made up of a disk portion 32 and a cylindrical wall portion 33. The disk portion 32 closes the cylindrical wall portion 33 at one end and the open end is reinforced by a ring 31 that defines a circular periphery for the screen member 30. The screen member 30 is further reinforced by a hub 35 and spokes 36 secured to the disk portion 32. A shaft 34 is fixedly secured to the hub 35 and extends centrally through the cylindrical wall portion 33 for a distance in excess of the cylindrical wall portion 33.

The screen member 30 is mounted on the housing 10 about axis X—X by inserting the shaft 34 through the bearings carried by the bearing support plates 40 and 46 and aligning the ring 31 of the screen member between the first and second rims 20 and 41, respectively. After the screen member 30 has been mounted, a drive means 70 is secured to the free end of the shaft 34. In FIGURE 1, a four-bladed fan 71 is illustrated as the drive means. However, it should be understood that power drive means or a fan having additional blades could be utilized.

The housing 10 also supports a baffle generally designated 60 formed from a sheet 61 in the shape of a segment of a disk and a sheet 62 in the shape of an arc of a cylinder. The baffle 60 is connected to the housing 10 through the bearing support plate 44 and the second annular rim 41. The purpose of the baffle is to stop the flow of air through a segmnet of the screen member 30 that is aligned with the baffle and thus permit dust and debris adhering to the outer surface of the screen member 30 to fall by gravity.

A seal means designated 50 is secured to the screen member 30 along the outer surface of the ring 31. The seal means is made up of a continuous ribbon of brush 51 and a base 52 in which the bristles are carried. The brush is arranged such that the bristles extend radially of the drum-shaped screen member 30. The bristles are of such a length that they will engage the inner periphery 21 of the first annular rim 20. As shown in FIGURES 2 and 4, the length of the bristles are such that they engage the surface 21 and are bent back, their ends forming a trailing edge as the screen member 30 is rotated.

In the embodiment illustrated in FIGURES 1, 2 and 4, the bristles making up the brush are sparse enough to permit the passage of clean air, but any dust or foreign matter in the air is caught by the bristles. As the screen member 30 rotates, the bristles will eventually encounter one of the edges 22 at which time they are permitted to flick outwardly and thus disengage any dust or foreign matter that they have collected. After the bristles pass through the break 23, they engage the other end 22 and they are again bent over by their engagement with the cylindrical surface 21. This embodiment because of the sparse brush that will permit the passage of air, has a relatively low coefficient of friction between the brush and the cylindrical surface 21.

Figure 3:
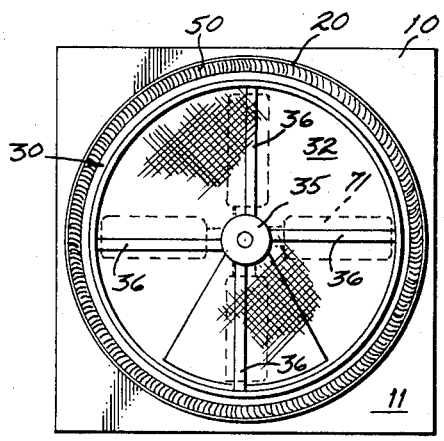
FIGURE 3 is a front view of another embodiment of the air-cleaning device.

In FIGURE 3, a second embodiment of the invention is shown. In this embodiment, the first annular rim 21 is continuous and there are no ends or break in the rim. In this embodiment, a dense brush is used through which air cannot pass and therefore, there is little accumulation of dust and foreign material on the bristles of the brush.

Figure 5:
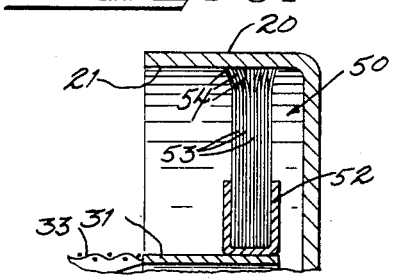
FIGURE 5 is an enlarged cross-sectional view similar to FIGURE 4 but of another embodiment of the invention.

In FIGURE 5, still another embodiment of the invention is disclosed. In this embodiment, the brush is made up of long 54 and short 53 bristles. The short bristles are of a length that will produce little or no frictional engagement with the inner surface 21 of the rim 20. The long bristles 54 of this brush are of a length such that they will engage the surface 21 and will be bent back during rotation of the screen member 30. In this embodiment the short bristles 53 in combination with the long bristles 54 have a density such that air is not permitted to pass through the brush and thus there is no accumulation of dust on the bristles of the brush. Since only the long bristles 54 have frictional engagement with the surface 21, the frictional drag is minimized and excess power is not required to rotate the screen member 30. In this embodiment of the invention, a continuous first annular rim 20 is utilized since it is not necessary to flick the accumulated dust from the brush.

What is claimed is:

1. In an air cleaning device, the combination of a housing having a wall with an air intake opening formed therein,
a first annular rim encircling said intake opening carried by said housing and including an inner generally cylindrical periphery,
a rotary screen member including a ring means having an outer circular periphery of a smaller diameter than said inner generally cylindrical periphery and telescopically received within and in spaced relation to said first annular rim,
support means for rotatably mounting said rotary screen on said housing about an axis substantially coaxial with said peripheries,
seal means between the peripheries,
said seal means comprising a continuous ribbon of brush fixedly secured to said ring and projecting into sealing relation with said inner generally cylindrical periphery,
and wherein the bristles of said brush extend radially outwardly of said axis.

2. The invention as set forth in claim 1 wherein there is a break in said first annular rim such that when a portion of the brush reaches the break in said annular rim the bristles will flick outwardly to disengage any foreign matter adhering thereto.

3. The invention as set forth in claim 1 wherein said support means include a second annular flange being of a smaller diameter than and located concentrically of said first annular flange and said ring means.

4. The invention as set forth in claim 1 wherein said continuous ribbon of brush includes a mingling of long and short bristles to reduce the friction in said seal means.

5. The invention as set forth in claim 1 wherein said continuous ribbon of brush includes a mingling of long and short bristles to reduce the friction in said seal means.

6. In an air-cleaning device, the combination of a housing having a wall with an air intake opening formed therein,
a first annular rim encircling said intake opening carried by said housing and including an inner generally cylindrical periphery,
a rotary screen member including a ring means having an outer circular periphery of a smaller diameter than said inner generally cylindrical periphery and telescopically received within and in spaced relation to said first annular rim,
support means for rotatably mounting said rotary screen on said housing about an axis substantially coaxial with said peripheries, said support means including a second annular flange being of a slightly smaller diameter than and located concentrically of said ring means,
seal means between the peripheries,
said seal means comprising a continuous ribbon of brush fixedly secured to one of said peripheries and projecting into sealing relation with the other periphery,
and wherein, the bristles of said brush extend radially of said axis.

References Cited

UNITED STATES PATENTS

| | | | |
|---|---|---|---|
| 484,717 | 10/1892 | Ince | 55—477 |
| 3,002,585 | 10/1961 | Pasturczak | 55—290 |

FOREIGN PATENTS

| | | |
|---|---|---|
| 511,455 | 8/1939 | Great Britain. |
| 529,017 | 6/1955 | Italy. |
| 866,661 | 5/1941 | France. |

HARRY B. THORTON, Primary Examiner

U.S. Cl. X.R.

55—404, 477